Jan. 4, 1955
V. J. HOLOPAINEN
2,698,697
POWER-OPERATED SHOVEL
Filed July 14, 1948
3 Sheets-Sheet 1
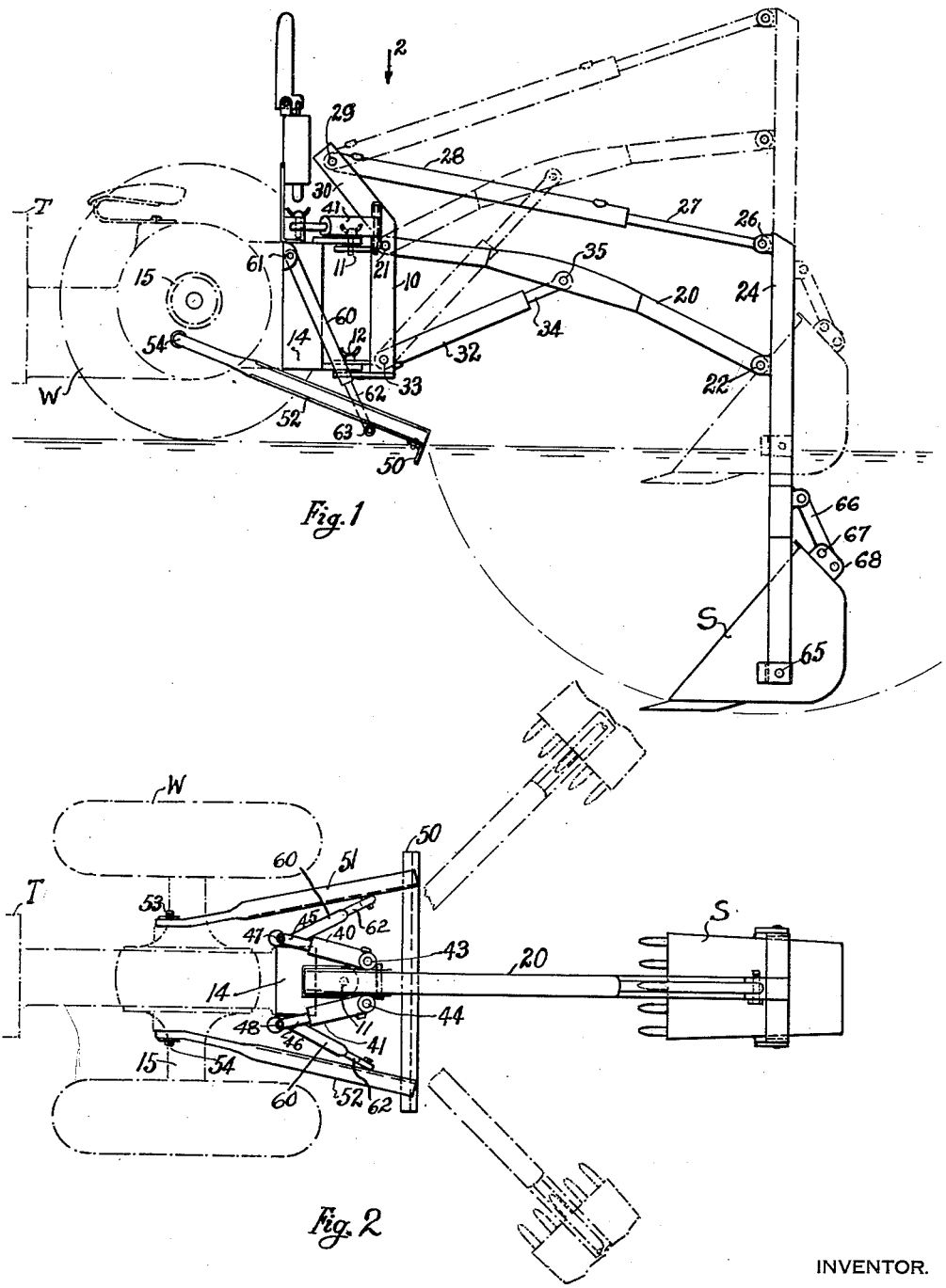
INVENTOR.
Vaino Holopainen
BY Chas. T. Hawley
ATTORNEYS.

United States Patent Office 2,698,697
Patented Jan. 4, 1955

2,698,697

POWER-OPERATED SHOVEL

Vaino J. Holopainen, Hubbardston, Mass., assignor to Wain-Roy Corporation, Hubbardston, Mass., a corporation of Massachusetts Application July 14, 1948, Serial No. 38,595

13 Claims. (Cl. 214—138)

This invention relates to power operated shovels, and more particularly to a machine adapted for digging ditches but also useful for many other similar purposes. The specific machine described herein is of the type in which a shovel is mounted at the rear of a tractor or any other type of vehicle and is moved toward the tractor on its digging stroke.

It is the general object of my invention to provide an improved construction for a power operated shovel, so that more convenient, effective and economical results may be attained.

To the accomplishment of this general purpose, an important feature of the invention relates to the provision of improved shovel-operating mechanism by which the front wheels of the tractor are firmly held in contact with the ground during a digging stroke of the shovel, and the weight of the tractor is rendered more effective to force the shovel downwardly into the ground.

A further object of the invention is to provide a power operated shovel which can be moved suddenly downward into contact with the ground to produce an impact capable of breaking through a comparatively hard surface.

A further object of the invention is to provide a power operated shovel adapted for mounting upon an ordinary farm tractor and so constructed as to avoid the application of sudden shocks or excessive forces to the tractor frame.

Further features relate to the provision of a hydraulically operated anchoring brace bar for such a machine, and to provision of improved mechanism for swinging the shovel sidewise and for hydraulically locking the shovel in any desired angular position or at any desired elevation.

My invention further relates to arrangements and combinations of parts which will be hereinafter described and more particularly pointed out in the appended claims.

A preferred form of the invention is shown in the drawings, in which

Fig. 1 is a side elevation of a power operated shovel particularly adapted for digging ditches or similar excavations, the shovel being shown in a lowered position;

Fig. 2 is a plan view of the mechanism shown in Fig. 1;

Figure 3:
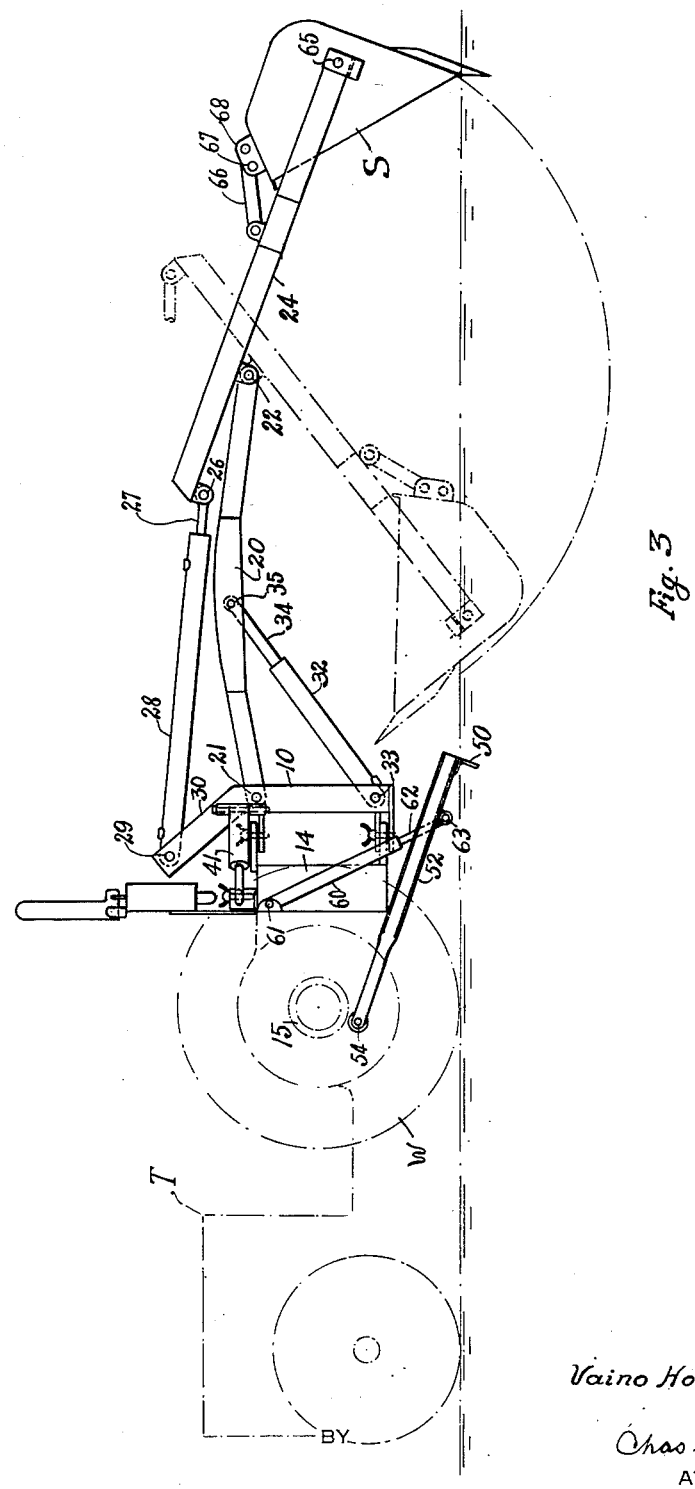
Fig. 3 is a view similar to Fig. 1 but showing the parts in a different position.

Referring to Figs. 1 and 2, a supporting member 10 is mounted on vertically aligned pivot-pins 11 and 12 in a rearward extension 14 of the frame of a tractor T, the rear wheels W and axle casing 15 being shown in broken lines in Figs. 1 and 2.

A rigid main arm or boom 20 is pivoted at one end at the point 21 to the supporting member 10, so that the boom may swing in a vertical plane. The other end of the boom is pivotally connected at the point 22 to a bar 24 forming a dipper stick. The upper end of the dipper stick 24 is pivotally connected at 26 to the rod 27 of a piston slidable in a double-acting cylinder 28, this cylinder in turn being pivoted at 29 to an upward and forwardly-inclined extension 30 of the supporting member 10. The forked lower end of the dipper stick 24 carries the shovel S. It will thus be seen that the dipper stick 24 is connected to the supporting member 10 by means of two links located one above the other. One of these links comprises the boom 20, and the other link comprises the cylinder 28 and its piston rod 27. The front or inner ends of these links are spaced from one another along the supporting member 10, whereas their rear or outer ends are spaced from one another along the dipper stick 24.

A single-acting lifting cylinder 32 is pivoted to the supporting member 10 at 33 an appreciable distance below the pivot 21, and the associated piston rod 34 is pivoted to the boom 20 at the point 35.

By the application of hydraulic pressure in the cylinder 32, the boom 20 may be moved from the full line position to the raised or dotted-line position in Fig. 1, or may be held at any intermediate desired height.

By the application of hydraulic pressure at one end or the other of the double-acting cylinder 28, the dipper stick 24 may be swung about its pivot 22 for a digging or dumping operation.

Suitable provision is made for swinging the boom 20 and shovel S about the vertical pivot pins 11 and 12. For this purpose, single-acting cylinders 40 and 41 (Fig. 2) are pivoted at 43 and 44 respectively to brackets on the opposite sides of the boom supporting member 10, and the associated piston rods 45 and 46 are pivoted at 47 and 48 respectively to brackets on the opposite sides of the tractor frame extension 14.

Figure 4:
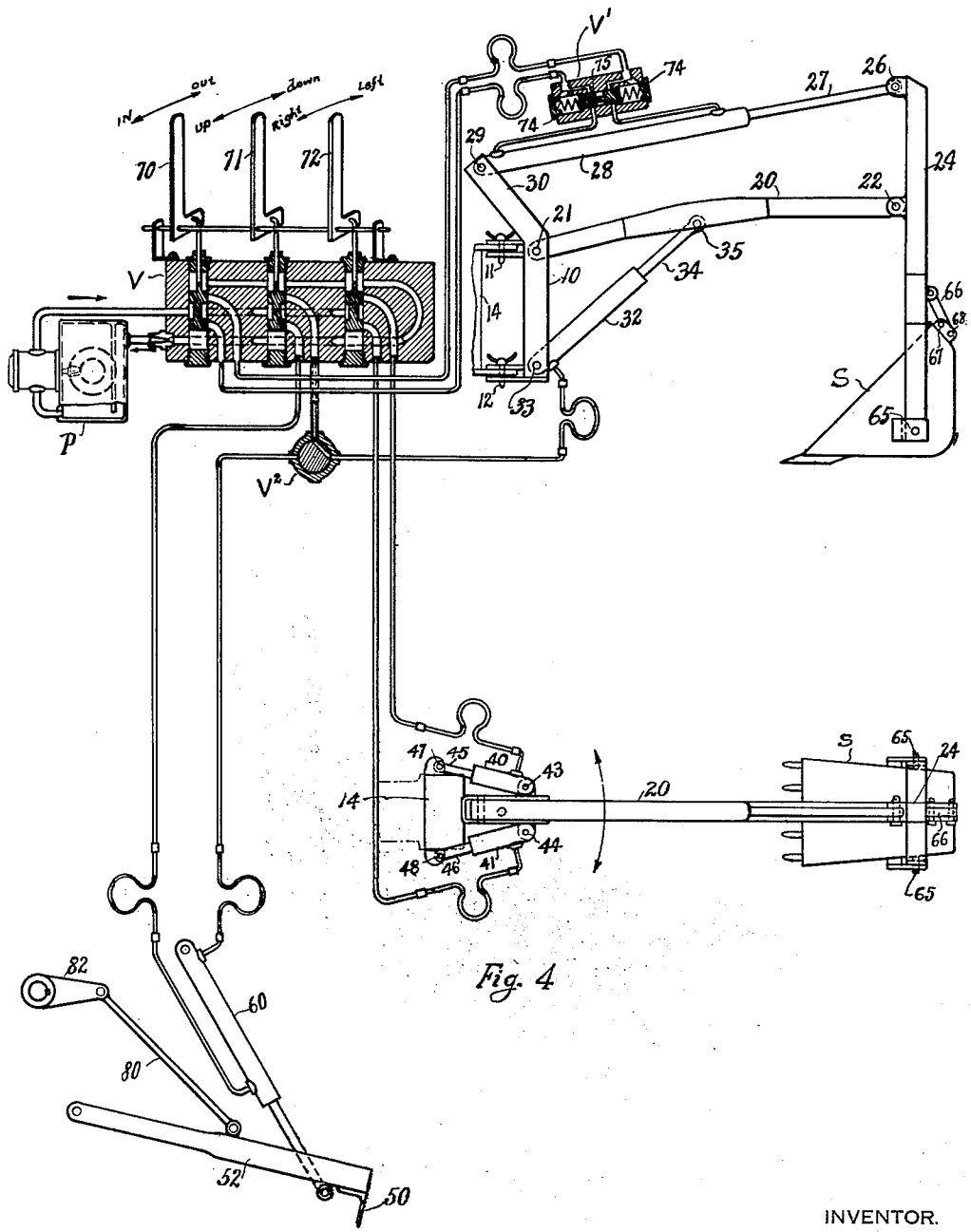
Fig. 4 is a diagrammatic view showing the hydraulic mechanism by which the shovel is controlled and operated.

Provision is made as shown in Fig. 4 for admitting hydraulic liquid under pressure at the closed end of one of the cylinders 40 and 41 and for exhausting liquid simultaneously from the corresponding end of the other cylinder. Such application of hydraulic pressure effects swinging movement of the boom 20 and shovel S from the full line mid position shown in Fig. 2 toward either of the dotted line positions. As the liquid is locked in both cylinders when the boom is stationary, the boom will be held in any position to which it is moved.

Special provision is made for anchoring the tractor against the backward pull of the shovel and for protecting the tractor frame from sudden shocks or excessive forces during the operation of the shovel. For this purpose there is provided a stabilizing mechanism comprising a transverse horizontal cross bar or angle iron 50 mounted on arms 51 and 52 (Fig. 2) which are pivoted at 53 and 54 respectively to the tractor frame.

Hydraulic cylinders 60 (Figs. 1 and 2) are pivoted at 61 to opposite sides of the frame extension 14, and the coacting piston rods 62 are pivoted at 63 to the arms 51 and 52. The cylinders 60 are preferably double-acting, so as to force the cross bar 50 into the ground for anchoring and stabilizing purposes as shown in Fig. 1, or to raise the bar above the ground when the machine is to be moved. The cylinders 60 and the associated piston rods 62 form links which are inclined upwardly and forwardly toward the tractor (Fig. 1) and upwardly and inwardly toward the frame extension 14 (Fig. 2).

The shovel S is pivoted at 65 to the dipper stick 24 and is also connected thereto by a link 66 secured to the shovel by a crosspin 67, so that the shovel S and dipper stick 24 normally comprise a rigid unit. The relative angular position of these parts to each other may be varied, however, by inserting the pin 67 in different holes in a bracket 68 on the shovel S.

Suitable hydraulic operating and control mechanism is indicated in Fig. 4 as comprising a pump P, a main valve block V and a plurality of operating handles 70, 71 and 72. A self-locking valve V' is provided for the double-acting cylinder 28, and a three-way valve V2 permits the handle 71 to selectively control the boom lifting cylinder 32 or the cylinders 60 which raise and lower the cross bar 50.

Connecting pipes from the main valve block V to the valves V' and V2 and to the various operating cylinders are indicated diagrammatically in Fig. 4, and the loops in the pipes indicate flexibility as required for relative movement of the connected parts.

The pump P and valves V, V' and V2 may be of usual and well-known commercial construction.

The handle 70 controls the supply of liquid under pressure to either end of the cylinder 28 by which the dipper stick 24 is swung in a vertical plane about its horizontal pivot 22 on the boom 20. When the handle 70 is returned to mid position, springs 74 in the valve V' return a piston 75 to mid position and thus lock the piston on the piston rod 27 from further movement in the cylinder 28.

When the three-way valve V2 is in the position shown in Fig. 4, the handle 71 may be used to control the supply of liquid to the cylinder 32 by which the boom 20 is raised or lowered. When the position of the valve V2 is reversed, the handle 71 may be used to control the supply of liquid under pressure to the double-acting cylinders 60 which raise and lower the anchoring cross bar 50.

The handle 72 controls the supply of liquid to the cylinders 40 and 41 which swing the boom 20 and shovel S to the right or left according to the direction in which the handle 72 is moved. These cylinders are both closed when the handle 72 is in mid position. Under these conditions the hydraulic pressure will take up any looseness or lost-motion in the pivots 43, 44, 47 and 48, and the boom will be firmly locked against swinging movement in either lateral direction.

In Fig. 1, the operation of the cylinder 32 in raising or lowering the shovel S is illustrated, and in Fig. 3 the operation of the cylinder 28 in swinging the shovel S in a vertical plane is clearly shown. By combining these two movements in selected combinations, the shovel may be caused to travel in various paths as required by the nature of the soil or the progress of the digging operation.

When the shovel is in the full line position shown in Fig. 3, it may be raised somewhat above the surface of the ground by operating the cylinder 32. In this position of the various parts the pivot 26 is only a short distance above the line joining the pivots 22 and 29, and a slight movement of the piston rod 27 will produce a considerable vertical movement of the shovel. Hence, if liquid under pressure is admitted to the cylinder 28 to move the piston rod 27 outwardly therefrom, the shovel will be moved downwardly very rapidly to strike the ground with a considerable impact. This is of great assistance in breaking into a hard ground surface.

When the shovel is filled and is in the dotted line position shown in Fig. 3, the cylinder 32 may be operated to raise the boom 20 and thus lift the shovel above the ground, and the cylinders 40 and 41 may then be used to swing the shovel to the right or left, after which the cylinder 28 may be operated to return the shovel to the full line position shown in Fig. 3 and to thereby dump the load at one side or the other of the ditch being excavated. Since the stabilizer bar 50 is located a substantial distance behind the tractor, it reduces the amount of overhang of the loaded shovel and braces the tractor against backward tipping when the shovel is lifted. Furthermore, since both stabilizer cylinders 60 are controlled simultaneously by the valve handle 71, the pressures in the corresponding ends of these cylinders will always be equal, and no extra forces will be applied to the frame extension 14 by these cylinders as the loaded shovel is swung to one side or the other.

Links 80 (Fig. 4) may be connected from the arms 51 and 52 to crank arms 82 forming part of the usual equipment of a commercial tractor. The arms 82 and links 80 may then be used to assist the cylinders 60 in operating the cross bar 50. In this event, the cylinders 60 may be made single-acting to apply downward or anchoring pressure only if so desired.

From inspection of Fig. 3 it will be apparent that when liquid is admitted under pressure to the front or closed end of the cylinder 28 to force the piston rod 27 outwardly from the cylinder and thereby swing the shovel S downwardly into the ground on its digging stroke, the resistance of the ground to penetration by the shovel will produce certain forces in various parts of the apparatus. Under these conditions the link formed by the cylinder 28 and its piston rod 27 will be loaded in compression, whereas the link formed by the boom 20 will be loaded in tension. Thus the forces applied to the supporting member 10 by these two links will be in the nature of a couple tending to increase the load on the front wheels of the tractor while decreasing the load on the rear wheels thereof, the weight of the tractor being in this manner rendered effective to force the shovel into the ground. Since the shovel moves forwardly as well as downwardly during its digging stroke, the resistance of the ground to such forward movement will increase the tension in the boom 20 and tend to move the tractor rearwardly toward the shovel, such movement being prevented by the anchoring effect of the stabilizer bar 50. The forces imposed on this bar by the reaction of the ground are transmitted in part through the arms 51 and 52 to the tractor frame, and in part through the hydraulic cylinders 60 to the frame extension 14. Because of this division of the forces, and particularly by reason of the cushioning effect of the hydraulic cylinders, the tractor is protected from shocks which may arise for example by engagement of the shovel with heavy stones or the like. Since the piston rod 27 has the effect of reducing the piston displacement in the rear of its piston, it will be apparent that the rearward or idle stroke of the shovel can be made at relatively high speed, whereas the forward or digging stroke will be made more slowly but with correspondingly greater force available from the cylinder 28 if required.

Having thus described my invention and the advantages thereof, I do not wish to be limited to the details herein disclosed, otherwise than as set forth in the claims, but what I claim is:

1. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick at a point spaced downwardly from the upper end thereof, a double-acting hydraulic jack pivoted at its front end to said supporting member and pivoted at its rear end to the top of the digger stick, valve means to selectively supply an hydraulic fluid to either end of said double-acting hydraulic jack and to coactively remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the intermediate portion of the boom to the supporting member, a stabilizer having a transverse bar for engagement with the ground beneath the supporting member and two laterally spaced arms sloping upwardly from the said bar and adapted for pivotal connection at their upper ends to the vehicle frame, and two laterally spaced links connecting the stabilizer to opposite sides of the said frame extension, each of said links comprising an hydraulic cylinder and an associated piston rod.

2. A digger as recited in claim 1, wherein: the second hydraulic jack and the said stabilizer hydraulic cylinder are separately connected to the same control, thus permitting the boom to be operated only when the stabilizer is locked in position.

3. A digger for use with a vehicle having a rigid frame and front and rear wheels, a swivel member mounted to swing on a vertical pivot at the rear of said frame and having an upward extension, a shovel located behind the swivel member and facing forwardly toward the vehicle, a dipper stick secured at its lower end to the shovel, a rigid boom pivoted at its front end to said swivel member and at its rear end to said dipper stick at a point spaced downwardly from the upper end thereof, a double-acting hydraulic jack pivoted at its front end to said upward extension of said swivel member and pivoted at its rear end to the top of the dipper stick, valve means to selectively supply an hydraulic fluid to either end of said double-acting jack and to coactively remove fluid from the other end thereof, thereby moving the shovel toward or away from the vehicle, the pivoted connection of the jack to the dipper stick being above the line joining the pivotal connection of the jack to the upward extension of the swivel member and the pivotal connection of the boom to the dipper stick, whereby outward pressure in said jack tends to move said shovel on a digging stroke toward the vehicle and at the same time tends to force the front portion of the vehicle strongly against the ground on which the vehicle stands, a second hydraulic jack connecting the intermediate portion of the boom to the lower portion of the swivel member, a stabilizer having a transverse bar for engagement with the ground beneath the supporting member and two laterally spaced arms sloping upwardly from the said bar and adapted for pivotal connection at their upper ends to the vehicle frame, and two laterally spaced links connecting the stabilizer to opposite sides of the said frame extension, each of said links comprising an hydraulic cylinder and an associated piston rod, the said second hydraulic jack and the stabilizer hydraulic cylinder being separately connected to the same control, thus permitting the boom to be operated only when the stabilizer is locked in position.

4. A digger for use with a vehicle having a rigid frame and front and rear wheels, a swivel member mounted to swing on a vertical pivot at the rear of said frame and having an upward extension, a shovel located behind the swivel member and facing forwardly toward the vehicle, a dipper stick secured at its lower end to the shovel, a rigid boom pivoted at its front end to said swivel member and at its rear end to said dipper stick at a point spaced downwardly from the upper end thereof, a double-acting hydraulic jack pivoted at its front end to said upward extension of said swivel member and pivoted at its rear end to the top of of the dipper stick, valve means to selectively supply a hydraulic fluid to either end of said double-acting jack and to coactively remove fluid from the other end thereof, thereby moving the shovel toward or away from the vehicle, the pivoted connection of the jack to the dipper stick being above the line joining the pivotal connection of the jack to the upward extension of the swivel member and the pivotal connection of the boom to the dipper stick, whereby outward pressure in said jack tends to move said shovel on a digging stroke toward the vehicle and at the same time tends to force the front portion of the vehicle strongly against the ground on which the vehicle stands, a second hydraulic jack connecting the intermediate portion of the boom to the lower portion of the swivel member for swinging movement of the boom in a vertical plane, and a third hydraulic jack connected at one end to the said rigid frame and at the other end to the swivel member for swinging movement of the boom, dipper stick, and shovel about said vertical pivot.

5. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick at a point spaced downwardly from the upper end thereof, a double-acting hydraulic jack pivoted at its front end to said supporting member and pivoted at its rear end to the top of the dipper stick, valve means to selectively supply an hydraulic fluid to either end of said double-acting hydraulic jack and to coactively remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the intermediate portion of the boom to the supporting member for the actuation of the boom, a stabilizer for engagement with the ground beneath the supporting member and comprising two laterally spaced arms sloping upwardly and forwardly and adapted for pivotal connection at their upper ends to the vehicle frame, and two laterally spaced links connecting the stabilizer to opposite sides of the said frame for raising and lowering the stabilizer, each of said links comprising an hydraulic cylinder and an associated piston rod.

6. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick at a point spaced downwardly from the upper end thereof, a double-acting hydraulic jack connected to the dipper stick to cause it to rotate about a horizontal axis through its connection to the boom, valve means selectively to supply a hydraulic fluid to either end of said double-acting hydraulic jack and to coactively remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the boom to the supporting member for the actuation of the boom, a stabilizer for engagement with the ground beneath the supporting member comprising two laterally spaced arms sloping upwardly and forwardly and adapted for pivotal connection at their upper end to the vehicle frame, said stabilizer being capable of movement from a position above the normal ground level to a position on or below the said ground level and capable of contacting the ground at a position considerably rearwardly of the axle of the rear wheels of the vehicle the supporting member being connected to the frame for pivotal movement about a vertical axis and two laterally spaced links connecting the supporting member to the said frame, each of said links comprising a hydraulic cylinder and an associated piston rod for causing the supporting member to rotate about the vertical axis of the connection of the supporting member to the frame.

7. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick, a double-acting hydraulic jack connected to the dipper stick at a point spaced from the connection of the boom therewith to cause it to rotate about a horizontal axis through its connection to the boom, valve means selectively to supply a hydraulic fluid to either end of said double-acting hydraulic jack and coactively to remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the boom to the supporting member for the actuation of the boom, a stabilizer for engagement with the ground beneath the supporting member comprising two laterally-spaced arms sloping upwardly and forwardly and adapted for pivotal connection at their upper ends to the vehicle frame, said stabilizer being capable of movement from a position above the normal ground level to a position on or below the said ground level and capable of contacting the ground at a position considerably rearwardly of the axle of the rear wheels of the vehicle, the supporting member being connected to the frame for pivotal movement about a vertical axis, and two laterally-spaced links connecting the supporting member to the said frame, each of said links comprising a hydraulic cylinder and an associated piston rod for causing the supporting member and the boom to rotate about the vertical axis of the connection of the supporting member to the frame.

8. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick at a point spaced downwardly from the upper end thereof, a double-acting hydraulic jack connected to the dipper stick to cause it to rotate about a horizontal axis through its connection to the boom, valve means selectively to supply a hydraulic fluid to either end of said double-acting hydraulic jack and coactively to remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the boom to the supporting member for the actuation of the boom, a stabilizer for engagement with the ground beneath the supporting member comprising an arm sloping upwardly and forwardly and adapted for pivotal connection at its upper end to the vehicle frame, said stabilizer being capable of movement from a position above the ground level to a position on or below the said ground level and capable of contacting the ground at a position considerably rearwardly of the axle of the rear wheels of the vehicle, the supporting member being connected to the frame for pivotal movement about a vertical axis, and two laterally-spaced links connecting the supporting member to the said frame, each of said links comprising a hydraulic cylinder and an associated piston rod for causing the supporting member and the boom to rotate about the vertical axis of the connection of the supporting member to the frame.

9. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick at a point spaced downwardly from the upper end thereof, a double-acting hydraulic jack connected to the dipper stick to cause it to rotate about a horizontal axis through its connection to the boom, valve means selectively to supply a hydraulic fluid to either end of said double-acting hydraulic jack and coactively to remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the boom to the supporting member for the actuation of the boom, a stabilizer for engagement with the ground beneath the supporting member comprising two laterally-spaced arms sloping upwardly and forwardly and adapted for pivotal connection at their upper ends to the vehicle frame, said stabilizer being capable of movement from a position above the normal ground level to a position on or below the said ground level and capable of contacting the ground at a position considerably rearwardly of the axle of the rear wheels of the vehicle, the supporting member being connected to the frame for pivotal movement about a vertical axis, and means connecting the supporting member to the said frame, said means comprising a hydraulic cylinder and an associated piston rod for causing the supporting member and the boom to rotate about the vertical axis of the connection of the supporting member to the frame.

10. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick at a point spaced downwardly from the upper end thereof, a double-acting hydraulic jack connected to the dipper stick to cause it to rotate about a horizontal axis through the connection to the boom, valve means selectively to supply a hydraulic fluid to either end of said double-acting hydraulic jack and coactively to remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the boom to the supporting member for the actuation of the boom, a stabilizer for engagement with the ground beneath the supporting member comprising an arm sloping upwardly and forwardly and adapted for pivotal connection at its upper end to the vehicle frame, said stabilizer being capable of movement from a position above the normal ground level to a position on or below the said ground level and capable of contacting the ground at a position considerably rearwardly of the axle of the rear wheels of the vehicle, the supporting member being connected to the frame for pivotal movement about a vertical axis, and means connecting the supporting member to the said frame, said means comprising a hydraulic cylinder and an associated piston rod for causing the supporting member and the boom to rotate about the vertical axis of the connection of the supporting member to the frame.

11. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick, a double-acting hydraulic jack connected to the dipper stick at a point spaced from the connection of the boom therewith to cause it to rotate about a horizontal axis through its connection to the boom, valve means selectively to supply a hydraulic fluid to either end of said double-acting hydraulic jack and coactively to remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the boom to the supporting member for the actuation of the boom, a stabilizer for engagement with the ground beneath the supporting member comprising an arm sloping upwardly and forwardly and adapted for pivotal connection at its upper end to the vehicle frame, said stabilizer being capable of movement from a position above the normal ground level to a position on or below the said ground level and capable of contacting the ground at a position considerably rearwardly of the axis of the rear wheels of the vehicle, the supporting member being connected to the frame for pivotal movement about a vertical axis, and two laterally-spaced links connecting the supporting member to the said frame, each of said links comprising a hydraulic cylinder and an associated piston rod for causing the supporting member and the boom to rotate about the vertical axis of the connection of the supporting member to the frame.

12. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick, a double-acting hydraulic jack connected to the dipper stick at a point spaced from the connection of the boom therewith to cause it to rotate about a horizontal axis through its connection to the boom, valve means selectively to supply a hydraulic fluid to either end of said double-acting hydraulic jack and coactively to remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the boom to the supporting member for the actuation of the boom, a stabilizer for engagement with the ground beneath the supporting member comprising two laterally-spaced arms sloping upwardly and forwardly and adapted for pivotal connection at their upper ends to the vehicle frame, said stabilizer being capable of movement from a position above the normal ground level to a position on or below the said ground level and capable of contacting the ground at a position considerably rearwardly of the axle of the rear wheels of the vehicle, the supporting member being connected to the frame for pivotal movement about a vertical axis, and means connecting the supporting member to the said frame, said means comprising a hydraulic cylinder and an associated piston rod for causing the supporting member and the boom to rotate about the vertical axis of the connection of the supporting member to the frame.

13. A digger for use with a vehicle having a rigid frame and front and rear wheels, a supporting member mounted at the rear of said frame, a shovel located behind the supporting member, a dipper stick secured at its lower end to the shovel, a rigid boom pivoted at its front end to said supporting member and at its rear end to said dipper stick, a double-acting hydraulic jack connected to the dipper stick at a point spaced from the connection of the boom therewith to cause it to rotate about a horizontal axis through its connection to the boom, valve means selectively to supply a hydraulic fluid to either end of said double-acting hydraulic jack and coactively to remove fluid from the other end thereof, thereby moving the shovel toward or away from the vehicle, pressure in said jack tending to move said shovel on a digging stroke toward the vehicle and at the same time tending to force the front portion of the vehicle strongly against the ground on which the vehicle stands, a second hydraulic jack connecting the boom to the supporting member for the actuation of the boom, a stabilizer for engagement with the ground beneath the supporting member comprising an arm sloping upwardly and forwardly and adapted for pivotal connection at its upper end to the vehicle frame, said stabilizer being capable of movement from a position above the normal ground level to a position on or below the said ground level and capable of contacting the ground at a position considerably rearwardly of the axle of the rear wheels of the vehicle, the supporting member being connected to the frame for pivotal movement about a vertical axis, and means connecting the supporting member to the said frame, said means comprising a hydraulic cylinder and an associated piston rod for causing the supporting member and the boom to rotate about the vertical axis of the connection of the supporting member to the frame.

(References on following page)

References Cited in the file of this patent

UNITED STATES PATENTS

| Number | Name | Date |
|---|---|---|
| 1,350,992 | Downie | Aug. 24, 1920 |
| 1,440,910 | Cole et al. | Jan. 2, 1923 |
| 1,504,427 | Butler | Aug. 12, 1924 |
| 1,561,694 | Clutter | Nov. 17, 1925 |
| 1,783,787 | Hansen | Dec. 2, 1930 |
| 1,840,666 | Grundon | Jan. 12, 1932 |
| 1,890,727 | Fundom | Dec. 13, 1932 |
| 2,075,954 | Osgood | Apr. 6, 1937 |
| 2,088,122 | Taylor | July 27, 1937 |
| 2,109,388 | Heller | Feb. 22, 1938 |
| 2,303,852 | Linn | Dec. 1, 1942 |
| 2,341,007 | Wommer | Feb. 8, 1944 |
| 2,365,169 | Billings | Dec. 19, 1944 |
| 2,381,199 | Baker | Aug. 7, 1945 |
| 2,387,764 | Maxwell | Oct. 30, 1945 |
| 2,391,857 | Arps et al. | Jan. 1, 1946 |
| 2,411,498 | Billings | Nov. 26, 1946 |
| 2,413,096 | Barker | Dec. 24, 1946 |
| 2,418,299 | Gorsuch | Apr. 1, 1947 |
| 2,449,212 | Fraga | Sept. 14, 1948 |
| 2,468,201 | Hoover | Apr. 26, 1949 |